(12) United States Patent
Fornage

(10) Patent No.: US 8,076,802 B2
(45) Date of Patent: Dec. 13, 2011

(54) METHOD AND APPARATUS FOR DISTRIBUTED VAR COMPENSATION

(75) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 316 days.

(21) Appl. No.: 12/370,036

(22) Filed: Feb. 12, 2009

(65) Prior Publication Data

US 2009/0200994 A1 Aug. 13, 2009

Related U.S. Application Data

(60) Provisional application No. 61/065,463, filed on Feb. 12, 2008.

(51) Int. Cl.
*G05F 3/06* (2006.01)
(52) U.S. Cl. ........................................ 307/151
(58) Field of Classification Search ............ 307/151
See application file for complete search history.

(56) References Cited

U.S. PATENT DOCUMENTS

| | | | |
|---|---|---|---|
| 4,345,162 A | 8/1982 | Hammer et al. | |
| 5,225,712 A * | 7/1993 | Erdman | 290/44 |
| 5,329,221 A * | 7/1994 | Schauder | 323/207 |
| 6,633,823 B2 | 10/2003 | Bartone et al. | |
| 6,850,820 B2 | 2/2005 | Tajima | |
| 7,660,139 B2 | 2/2010 | Garabandic | |
| 7,800,348 B2 * | 9/2010 | Zargari | 323/207 |
| 2007/0097565 A1 | 5/2007 | Oohara et al. | |
| 2007/0221267 A1 | 9/2007 | Fornage | |

OTHER PUBLICATIONS

"Inverters, Converters, Controllers and Interconnection System Equipment for Use With Distributed Energy Resources," Underwriters Laboratories Inc., UL Standard 1741.1, May 7, 1999, downloaded from web site http://ulstandardsinfonet.ul.com/scopes/1741.html on Jun. 12, 2009.
"IEEE Standard for Interconnecting Distributed Resources with Electric Power Systems," IEEE Std 1547™-2003, IEEE, Jul. 28, 2003, Copyright 2003 by the Institute of Electrical and Electronics Engineers, Inc.
Paserba, John J., "How Facts Controllers Benefit AC Transmission Systems." Downloaded on Jun. 23, 2009 from IEEE Xplore.
Xiao, Ying et al. "Power Flow Control Approach to Power Systems With Embedded Facts Devices," IEEE Transactions on Power Systems, vol. 17, No. 4, Nov. 2002, pp. 943-950.
Jóos, G. et al., "The Potential of Distributed Generation to Provide Ancillary Services," ISBN 0-7803-6420-1/00, © 2000 IEEE, pp. 1762-1767.
Weedy, B. M. & Cory, B. J., "Control of Voltage and Reactive Power," Electric Power Systems, 4th ed., ISBN 0-471-97677-6, Wiley, Jun. 4, 1998, pp. 193-228.
Datta, E. Kyle, "Incorporating Distributed Generation Into Hawaii's Utility Planning and Regulatory Processes," Rocky Mountain Institute. Downloaded from web site http://hawaii.gov/dbedt/info/energy/publications/dg04-1datta.pdf on May 20, 2009.

(Continued)

*Primary Examiner* — Rexford Barnie
*Assistant Examiner* — Hal Kaplan
(74) *Attorney, Agent, or Firm* — Moser Taboada

(57) ABSTRACT

A method and apparatus for generating on-demand power. The method comprises receiving a peak reactive current request, generating a control signal based on the peak reactive current request, and utilizing the control signal to drive a DC/AC inverter to generate reactive power commensurate with the peak reactive current request.

16 Claims, 6 Drawing Sheets

OTHER PUBLICATIONS

International Search Report and Written Opinion mailed Sep. 29, 2009 for PCT Application No. PCT/US2009/033880.

Li, Yunwei et al., "Design, Analysis, and Real-Time Testing of a Controller for Multibus Microgrid System," 2004 IEEE Transactions on Power Electronics, vol. 19, No. 5, Sep. 2004, pp. 1195-1204.

Piagi, Paolo et al., "Autonomous Control of Microgrids," 2006 IEEE Power Engineering Society General Meeting, Oct. 2006.

Lasseter, R. H., "MicroGrids," 2002 IEEE Power Engineering Society Winter Meeting, vol. 1, Jan. 2002, pp. 305-308.

Barnes, Mike et. al., "Real-World MicroGrids—An Overview," 2007 IEEE SoSE International Conference, Apr. 2007, pp. 1-8.

Zoka, Y., "An Interaction Problem of Distributed Generators Installed in a MicroGrid," 2004 IEEE International Conference on Electric Utility Deregulation, Restructuring and Power Technologies (DRPT2004), vol. 2, Apr. 2004, pp. 795-799.

* cited by examiner

METHOD AND APPARATUS FOR DISTRIBUTED VAR COMPENSATION

CROSS-REFERENCE TO RELATED APPLICATIONS

This application claims benefit of U.S. provisional patent application Ser. No. 61/065,463, filed Feb. 12, 2008, which is herein incorporated in its entirety by reference.

BACKGROUND OF THE INVENTION

1. Field of the Invention

Embodiments of the present disclosure generally relate to Volt-Ampere reactive (VAr) compensation and, more particularly, to a method and apparatus for generating on-demand VAr compensation.

2. Description of the Related Art

Current worldwide growth in demand for electricity is leading to a durable increase in energy usage. Due to such increased usage, power levels on the commercial power grid are nearing the maximum capacity of the grid, and building permits to expand on this capacity are becoming more difficult to obtain. The pressure to utilize the existing infrastructure to its maximum is therefore extreme.

Demand Response (DR) is a well-established business model used by utilities to increase the grid efficiency by reducing peak power requirements on the grid. The demand on the grid varies greatly seasonally as well as daily. The ratio between peak consumption, which drives the grid capacity, and least consumption, which usually occurs at night time, can easily reach 2:1. Therefore, it is highly desirable to limit the peak power as much as possible. In the DR model, utilities pay end users to reduce peak load at the utility's request, usually by changing users' thermostat values. A DR operator provides the thermostat and the transmission system required to carry the order. U.S. Pat. No. 4,345,162 discloses an example of DR technology.

Demand response affects the real load that a utility must provide power for, but does not impact a reactive load, which is almost as important. When the loads are not purely resistive, they consume or produce a reactive current which is at +/−90° from the voltage. These reactive currents create many challenges for the utilities, including inducing spurious losses on the lines and the generators, creating stability problems, and affecting the grid voltage. Large users are penalized when they circulate too much reactive current, i.e., the utility imposes a surcharge on the user.

The reactive power generated by a reactive current is the product of the grid voltage multiplied by the reactive current and is measured in Volt-Ampere reactive (VAr). Utilities do not charge for reactive power but can suffer greatly from its consequences. In order to offset the VArs created by the reactive loads, utilities deploy a large number of VAr compensators. They also use these VAr compensators to stabilize the grid and control the voltage. In addition, there is also a market to trade reactive power between utilities. VAr compensators are typically used at substations and at the large customer facilities. VAr compensators may comprise banks of capacitors, or Static Synchronous Compensators (STATCOMs), or static VAr compensators (SVCs).

With the advent of distributed renewable power generation, users may generate power and couple such generated power to the commercial power grid to sell power to the commercial power company. However, existing standards for distributed generators (DGs) usually prohibit the DG from generating reactive currents, leaving the utility to only see the reactive part of the load if the DG is offsetting the real load.

Therefore, there is a need in the art for a method and apparatus for utilizing DGs for generating on-demand VAr compensation.

SUMMARY OF THE INVENTION

Embodiments of the present invention relate to a method and apparatus for generating on-demand power. The method comprises receiving a peak reactive current request, generating a control signal based on the peak reactive current request, and utilizing the control signal to drive a DC/AC inverter to generate the reactive power commensurate with the peak reactive current request.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
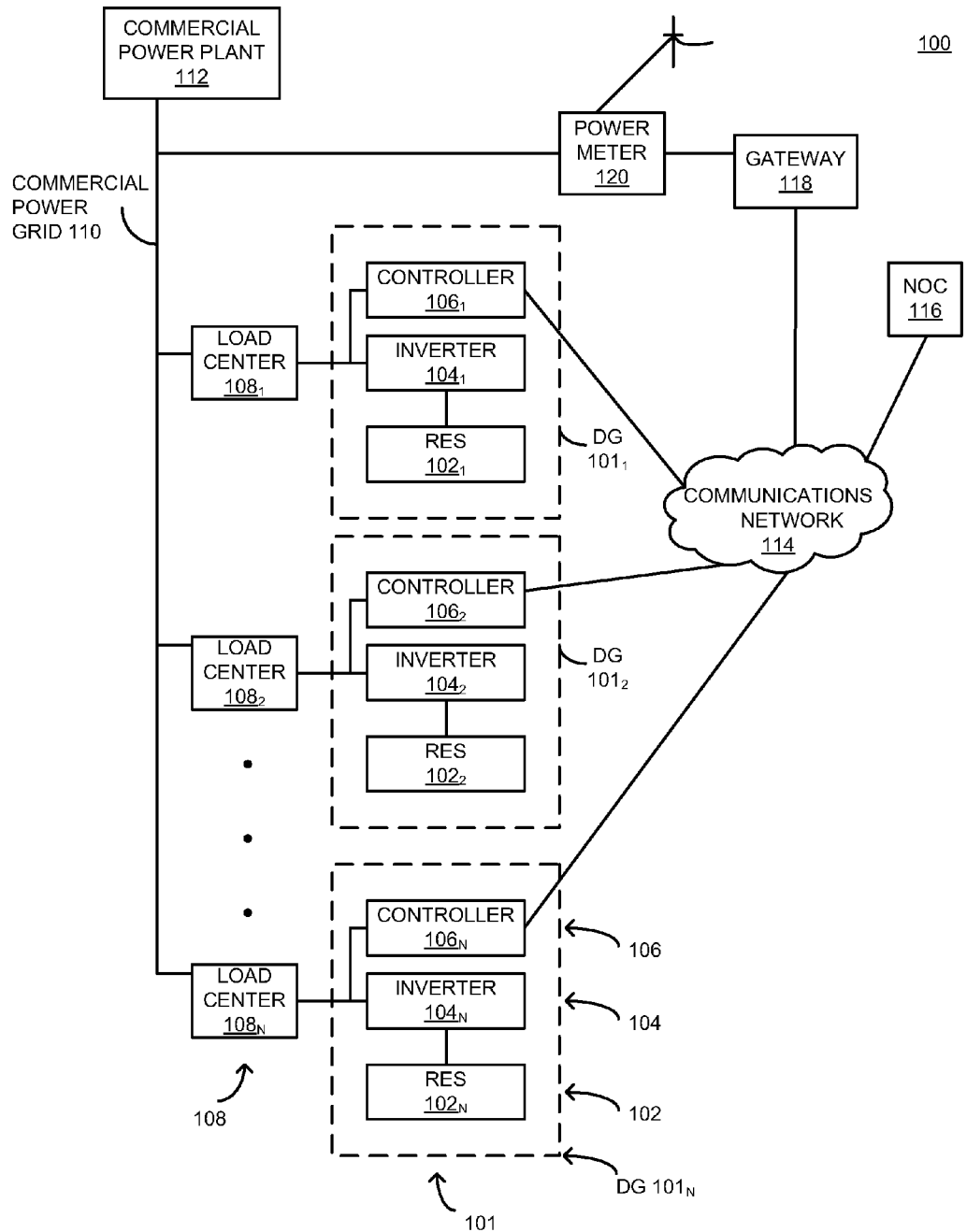
FIG. 1 is a block diagram of a distributed generator (DG) system for generating on-demand VAr compensation in accordance with one or more embodiments of the present invention.

FIG. 1 is a block diagram of a distributed generator (DG) system 100 for generating on-demand VAr compensation in accordance with one or more embodiments of the present invention. This diagram only portrays one variation of the myriad of possible system configurations. The present invention can function in a variety of distributed power generation environments and systems.

The DG system 100 comprises a plurality of renewable energy sources (RES) $102_1$, $102_2$ . . . $102_n$, collectively referred to as RESs 102, a plurality of inverters $104_1$, $104_2$ . . . $104_n$, collectively referred to as inverters 104, a plurality of controllers $106_1$, $106_2$ . . . $106_n$, collectively referred to as controllers 106, and a plurality of load centers $108_1$, $108_2$ . . . $108_n$, collectively referred to as load centers 108.

Each RES $102_1$, $102_2$ ... $102_n$ is coupled to an inverter $104_1$, $104_2$ ... $104_n$, respectively, and each inverter $104_1$, $104_2$ ... $104_n$ is further coupled to a controller $106_1$, $106_2$ ... $106_n$, respectively, comprising distributed generators (DGs) $101_1$, $101_2$ ... $101_n$, collectively referred to as DGs 101. Each DG $101_1$, $101_2$ ... $101_n$ is coupled to a load center $108_1$, $108_2$ ... $108_n$, respectively. In some embodiments, a plurality of inverters, such as micro-inverters, may be coupled to each RES 102. Additionally and/or alternatively, a DC/DC converter may be coupled between each RES 102 and each inverter 104 or micro-inverter (i.e., one converter per inverter 104 or micro-inverter).

The load centers 108 are coupled to a commercial power grid distribution system 110 ("grid") and house connections between incoming power lines from the grid 110 and the inverters 104. The grid 110 is further coupled to a commercial power plant 112 and distributes power generated by the power plant 112.

The RESs 102 generate DC power from a renewable form of energy, such as wind, solar, hydro, and the like. The inverters 104 convert such generated DC power to AC power and meter out AC current that is in-phase with the AC grid voltage. The generated AC current is coupled to the grid 110 via the load centers 108.

The DG system 100 further comprises a communications network 114, a Network Operations Center (NOC) 116, and a gateway 118. The communications network 114 may comprise dedicated cables, wireless networks, LANs, WANs, the Internet, and the like, and communicably couples the controllers 106, NOC 116, and gateway 118. In alternative embodiments, the gateway 118 may reside within the NOC 116; additionally and/or alternatively, the NOC 116 may communicate directly with the inverters 104 via the controllers 106.

The controllers 106 are capable of issuing command and control signals to the inverters 104 in order to control the functionality of the inverters 104. Additionally, the controllers 106 may collect data regarding the health and performance of the inverters 104, such as power generated, and communicate the collected data to the gateway 116.

The gateway 118 is a type of controller 106 for managing one or more DGs 101. The gateway 118 generally keeps track of the equipment inventory related to the DGs 101. Alternatively, the gateway 118 may communicate operational instructions to and/or collect health and performance data from one or more of the inverters 104. In some embodiments, the gateway 118 is coupled to a power meter 120 which is further coupled to the grid 110. The power meter 120 measures a power user's consumption of real (W) and reactive (VAr) power and provides such power consumption information to the gateway 118.

In accordance with one or more embodiments of the present invention, the gateway 118 operates under control of the NOC 116 and drives one or more inverters 104 to generate reactive power (i.e., VArs) on-demand. The gateway 118 may drive the inverters 104 via the controllers 106 or directly. In some embodiments, the gateway 118 may determine an optimum solution for VAr compensation amongst the resources that it controls. Alternatively, the NOC 116 may be tasked to provide the optimum solution.

Figure 2:
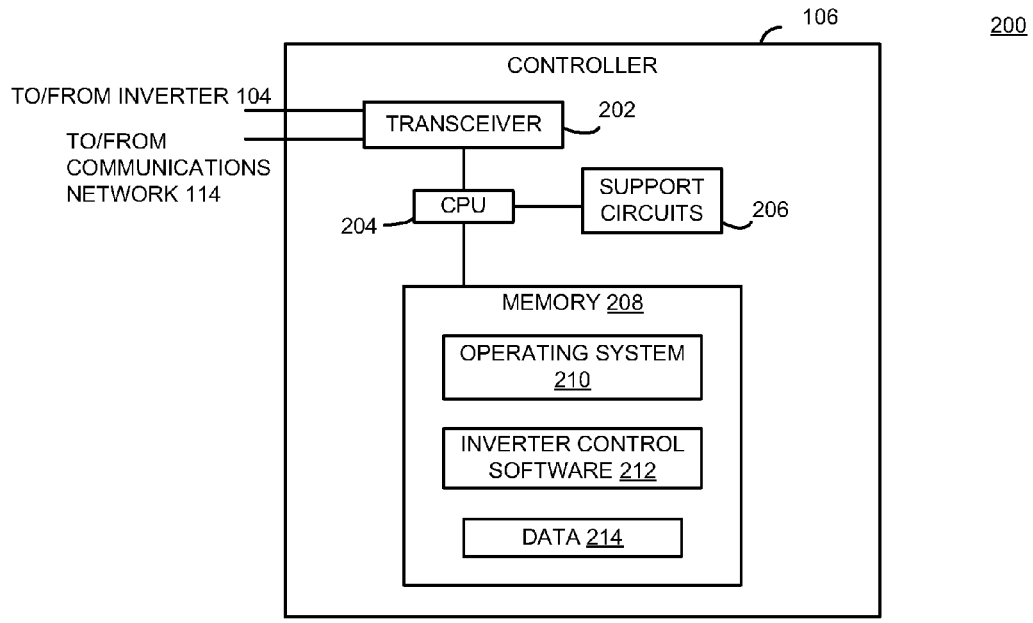
FIG. 2 is a block diagram of a controller in accordance with one or more embodiments of the present invention.

FIG. 2 is a block diagram 200 of a controller 106 in accordance with one or more embodiments of the present invention. The controller 106 comprises a transceiver 202 coupled to the inverter 104 and the communications network 114. The transceiver 202 is coupled to at least one central processing unit (CPU) 204, and the CPU 204 is additionally coupled to support circuits 206 and a memory 208. The CPU 204 may comprise one or more conventionally available microprocessors. Alternatively, the CPU 204 may include one or more application specific integrated circuits (ASIC). The support circuits 206 are well known circuits used to promote functionality of the CPU 204. Such circuits include, but are not limited to, a cache, power supplies, clock circuits, buses, network cards, input/output (I/O) circuits, and the like.

The memory 208 may comprise random access memory, read only memory, removable disk memory, flash memory, and various combinations of these types of memory. The memory 208 is sometimes referred to as main memory and may, in part, be used as cache memory or buffer memory. The memory 208 generally stores an operating system 210 of the controller 106. The operating system 210 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The memory 208 may store various forms of application software, such as inverter control software 212 for issuing command and control instructions to the inverter 104. Additionally, the memory 208 may store data 214, including health and performance data of the inverter 104, collected by the inverter control software 212. The transceiver 202 communicably couples the controller 106 to the inverter 104 to facilitate command and control of the inverter 104. Additionally, the transceiver 202 communicably couples the controllers 106 to the NOC 116 and/or to the gateway 118 via the communications network 114. The transceiver 202 may utilize wireless or wired communication techniques for such communication.

Figure 3:
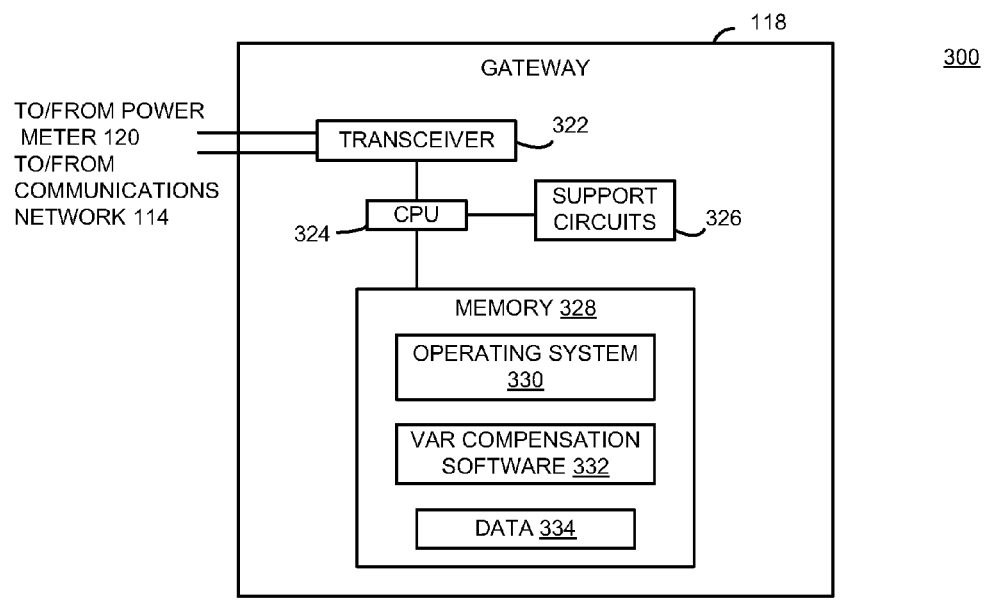
FIG. 3 is a block diagram of a gateway in accordance with one or more embodiments of the present invention.

FIG. 3 is a block diagram 300 of a gateway 118 in accordance with one or more embodiments of the present invention. The gateway 118 comprises a transceiver 322 coupled to the power meter 120 and the communications network 114. The transceiver 322 is coupled to at least one central processing unit (CPU) 324, and the CPU 324 is additionally coupled to support circuits 326, and a memory 328. The CPU 324 may comprise one or more conventionally available microprocessors. Alternatively, the CPU 324 may include one or more application specific integrated circuits (ASIC). The support circuits 326 are well known circuits used to promote functionality of the CPU 324. Such circuits include, but are not limited to, a cache, power supplies, clock circuits, buses, network cards, input/output (I/O) circuits, and the like.

The memory 328 may comprise random access memory, read only memory, removable disk memory, flash memory, and various combinations of these types of memory. The memory 328 is sometimes referred to as main memory and may, in part, be used as cache memory or buffer memory. The memory 328 generally stores an operating system 330 of the gateway 118. The operating system 330 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The memory 328 may store various forms of application software, such as VAr compensation software 332 for providing on-demand VAr compensation, as further discussed below. Additionally, the memory 328 may store data 334, such as inventory information regarding the inverters 104 and subtending components (e.g., controllers 106, RESs 102) managed by the gateway 118. The gateway 118 may store additional software, such as inverter control software, for controlling the inverters 104, and the data 334 may additionally comprise health and performance data of the inverters 104 provided by the controllers 106 or collected directly from the inverters 104.

The transceiver 322 communicably couples the gateway 118 to the controllers 106 and to the NOC 116, such that the NOC 116 may collect data from and/or issue commands to the gateway 118 for controlling the inverters 104. Additionally and/or alternatively, the gateway 118 may collect data from and/or issue control commands to the inverters 104 directly or via controllers 106. The transceiver 322 further communicably couples the gateway 118 to the power meter 120 such that the gateway 118 can obtain power data, such as consumption of real (W) and reactive (VAr) power by a particular power user. The transceiver 322 may utilize wireless or wired communication techniques for such communication.

Figure 4:
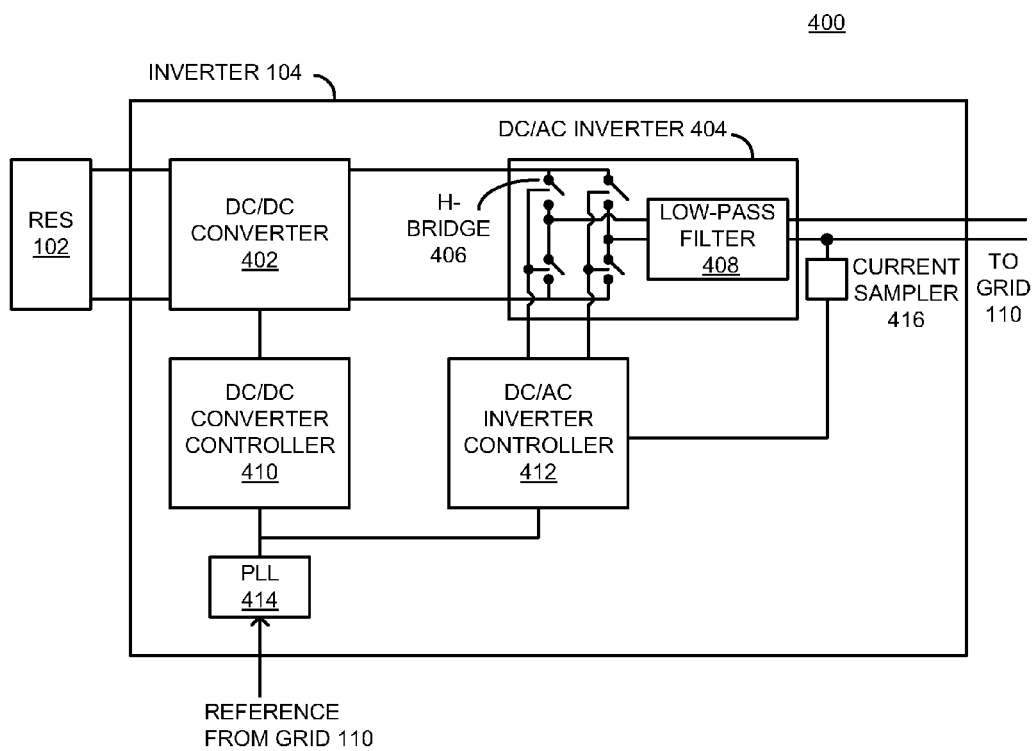
FIG. 4 is a block diagram of an inverter in accordance with one or more embodiments of the present invention.

FIG. 4 is a block diagram 400 of an inverter 104 in accordance with one or more embodiments of the present invention. The inverter 104 comprises a DC/DC converter 402, a DC/AC inverter 404, a DC/DC converter controller 410, a DC/AC inverter controller 412, a phase lock loop (PLL) 414, and a current sampler 416. Additionally, the DC/AC inverter 404 comprises a single-phase H-bridge 406 coupled to a low-pass filter 408. In alternative embodiments, a three-phase H-bridge may be utilized.

The DC/DC converter 402 is coupled via two input terminals to the RES 102 and via two output terminals to the DC/AC inverter 404. Two output terminals of the DC/AC inverter 404 are coupled to the grid 110; additionally, the current sampler 416 is coupled to one output terminal of the DC/AC inverter 404 and to the DC/AC inverter controller 412.

The PLL 414 receives a reference signal indicative of the commercial AC voltage from the grid 110. The PLL 414 generates a signal indicative of the AC grid voltage waveform and couples such signal to the DC/DC controller 410 and the DC/AC inverter controller 412. The DC/DC controller 410 is further coupled to the DC/DC converter 402, and the DC/AC inverter controller 412 is further coupled to the DC/AC inverter 404.

The DC/DC converter 402 accepts a DC input from the RES 102 and converts the DC input voltage to a second DC voltage as controlled by the DC/DC converter controller 410. In alternative embodiments, such DC/DC conversion may be provided by a separate DC/DC converter or may not be provided at all.

The DC power out of the DC/DC converter 402 is coupled to the H-bridge 406. The H-bridge 406 is implemented utilizing four semiconductor switches, such as bipolar junction transistors (BJTs), insulated gate bipolar transistors (IGBTs), silicon controlled rectifiers (SCRs), field effect transistors (FETs), and the like. The H-bridge 406 (i.e., the opening/closing of each switch) is driven by a control signal from the DC/AC inverter controller 412 such that the switches turn on and off sequentially to create a "chopped" waveform at the output of the H-bridge 406. The chopped waveform is then filtered by the low pass filter 408 to generate an AC current at the grid frequency with a low distortion. One example of such power conversion is commonly assigned U.S. Patent Application Publication Number 2007/0221267 entitled "Method and Apparatus for Converting Direct Current to Alternating Current" and filed Sep. 27, 2007, which is herein incorporated in its entirety by reference.

The AC current generated by the DC/AC inverter 404 is coupled to the grid 110. Additionally, the DC/AC inverter controller 412 drives the H-bridge 406 such that reactive power can be absorbed or generated and injected onto the grid 110 on-demand, as described in detail below.

Figure 5:
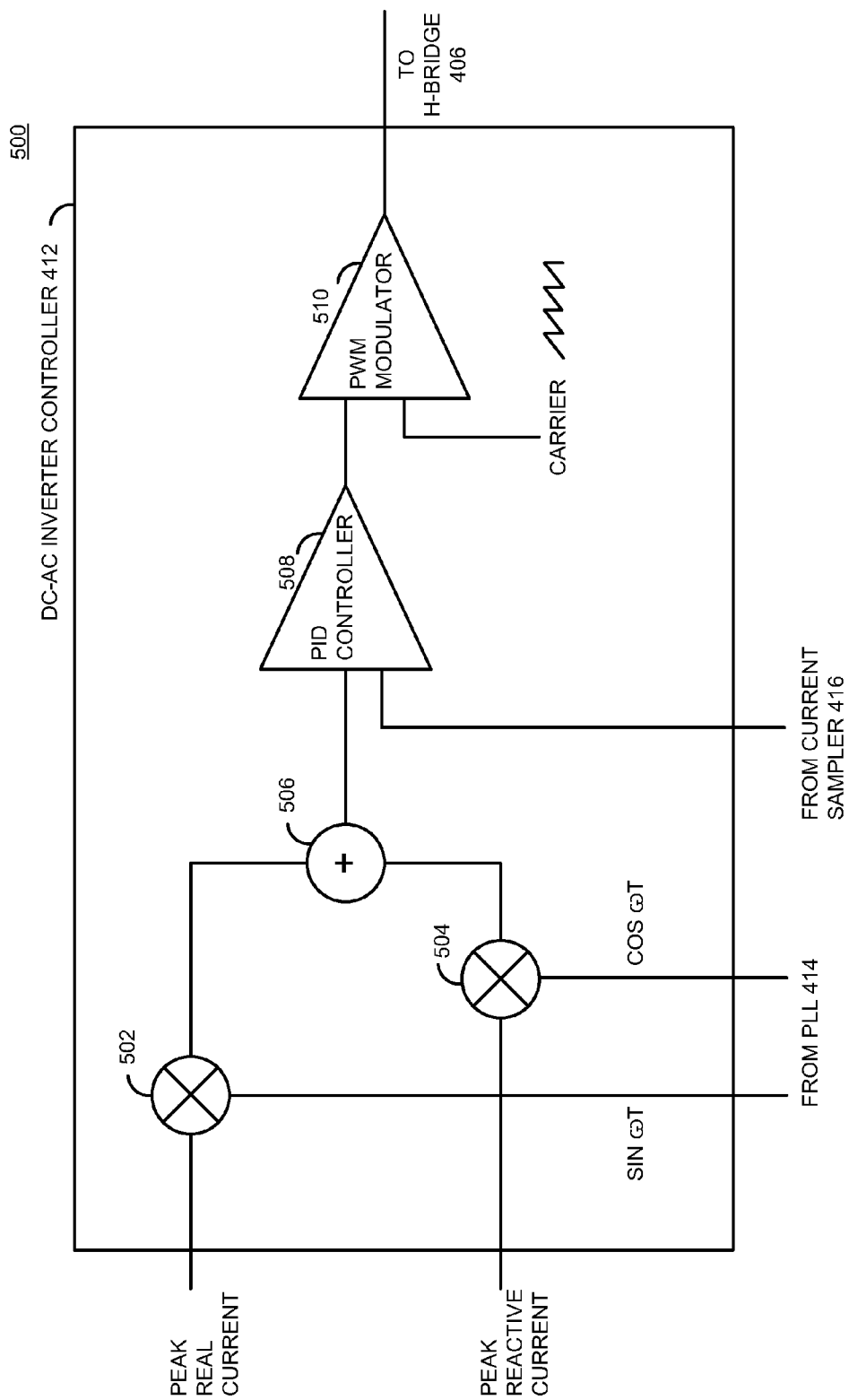
FIG. 5 is a block diagram of a DC/AC inverter controller in accordance with one or more embodiments of the present invention.

FIG. 5 is a block diagram 500 of a DC/AC inverter controller 412 in accordance with one or more embodiments of the present invention. The DC/AC inverter controller 412 comprises two multipliers, 502 and 504, an adder 506, a proportional-integral-derivative (PID) controller 508, and a pulse width modulation (PWM) modulator 510.

A signal indicative of a peak real current to be generated by the inverter 104 ("peak real current request") is provided as an input to the multiplier 502; in some embodiments, a maximum power point tracking (MPPT) module of the inverter 104 may provide the peak real current request. The multiplier 502 additionally receives an input from the PLL 414 of a sine wave at the grid frequency and phase. The multiplier 502 generates an output signal indicative of the peak real current request modulated by the grid-frequency sine wave, allowing a real AC power output from the inverter 104 to be injected onto the grid 110 in-phase with the commercial AC power. The output signal from the multiplier 502 is coupled to the adder 506.

A signal indicative of a peak reactive current to be generated by the inverter 104 ("peak reactive current request") is provided as an input to the multiplier 504. Such peak reactive current request may be provided via the controller 106 or the gateway 118. The multiplier 504 receives a second input from the PLL 414 of a cosine wave at the grid frequency; the cosine wave lags the sine wave from the PLL 414 by 90°. The multiplier 504 generates an output signal indicative of the peak reactive current request modulated by the cosine wave at the grid frequency and couples such signal to the adder 506.

The adder 506 generates a summation of the modulated peak real current request and the modulated peak reactive current request signals, and couples the resulting output to the PID controller 508. The PID controller 508 receives a second input from the current sampler 416 indicative of the AC current output from the inverter 104. The PID controller 508 functions to correct the error between the measured AC output current and the desired output current (i.e., the summation of the modulated peak real current request and the modulated peak reactive current request) by generating a signal to drive the H-bridge 406 such that the error is driven to zero.

The output of the PID controller 508 is coupled to the PWM modulator 510. Additionally, the PWM modulator 510 receives an input signal of a carrier waveform, such as a sawtooth waveform generated by an oscillator. The resulting control signal from the PWM modulator 510 is coupled to the H-bridge 406 and drives the H-bridge 406 to generate a chopped waveform in accordance with the peak real current request and the peak reactive current request. The chopped waveform is subsequently low-pass filtered by the low pass filter 408, and the resulting AC current is coupled to the grid 110.

Thus, the generated AC current comprises a real power component in accordance with the peak real current request, and a reactive power component in accordance with the peak reactive current request. The separate inputs for the real and reactive power components allow reactive power to be generated independently of real power to provide on-demand VAr compensation as needed. Additionally, VAr compensation may be generated when there is no energy input to the RESs 101 (e.g., during periods of no wind or no sunlight). In such a case, a small amount of real power is dissipated in the inverter 104 when the VArs are circulated.

Figure 6:
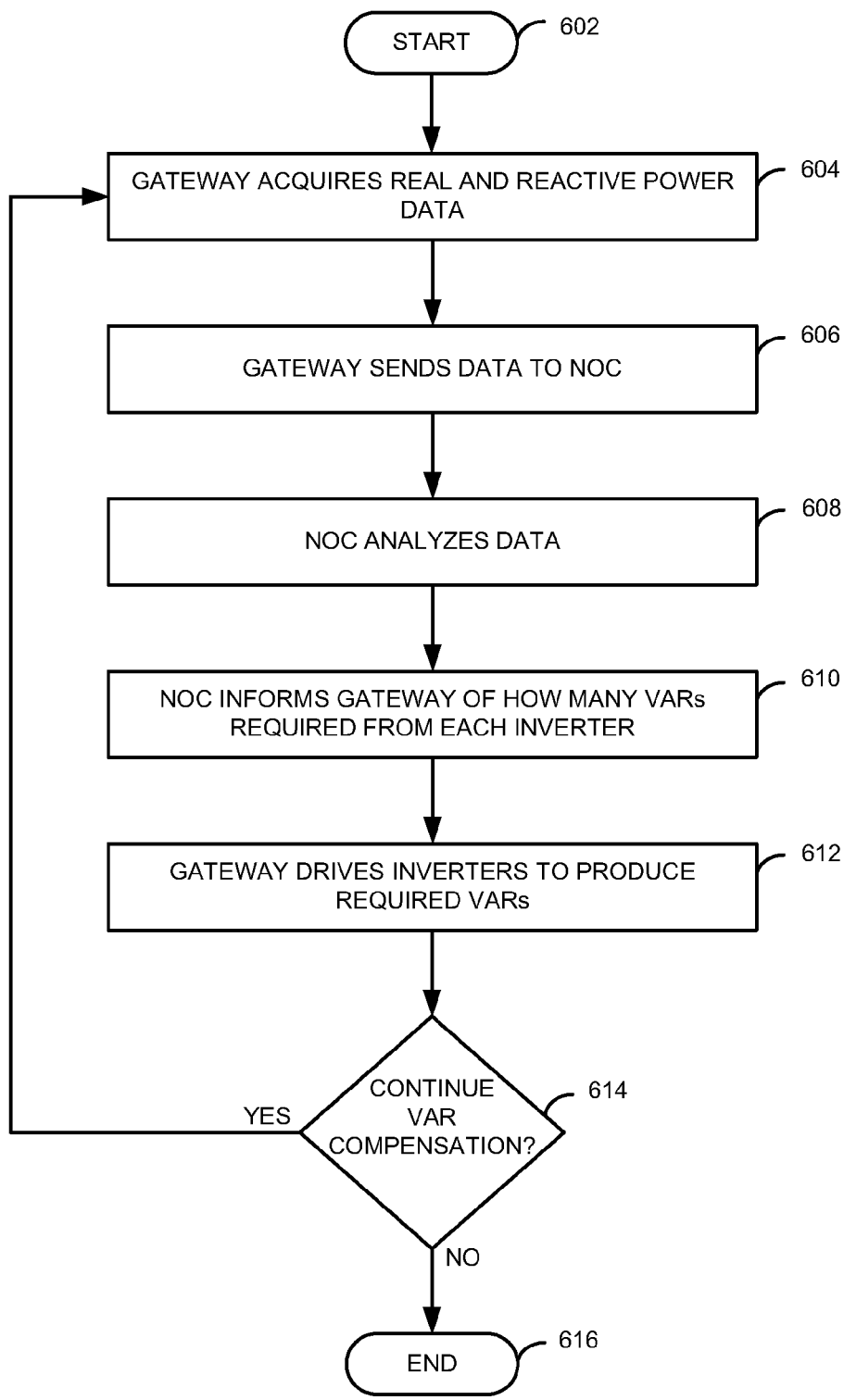
FIG. 6 is a flow diagram of a method for generating distributed on-demand VAr compensation for a private owner of a DG in accordance with one or more embodiments of the present invention.

FIG. 6 is a flow diagram of a method 600 for generating distributed on-demand VAr compensation for a private owner of a DG in accordance with one or more embodiments of the present invention. In some embodiments, such as the embodiment described below, a private power user who also owns one or more DGs, such as the DGs 101, may utilize the DG system to generate and circulate reactive power on the commercial power grid to compensate for excessive VArs consumption. Such VAr compensation may increase the power user's power factor (PF) and maintain the PF above a threshold at which the utility would impose a fine on the power user.

The method 600 begins at step 602 and proceeds to step 604. At step 604, a gateway coupled to the commercial power grid obtains real and reactive power data (e.g., power consumption) for the power user. In some embodiments, the gateway obtains such power consumption data from a power meter coupled to the commercial power grid. The method 600 proceeds to step 606, where the gateway provides the user's power consumption data to a NOC. Generally, the NOC or a component of the NOC is operated by a VAr management entity.

At step 608, the NOC analyzes the user's power consumption data and determines the amount of VAr compensation required from each inverter in the power user's DG (i.e., how many VArs each inverter must produce). In some embodiments, the NOC may determine an optimum number of inverters to provide the VAr compensation with minimal real power dissipation. A power loss L resulting from power dissipated by generating reactive power Q can be expressed as a polynomial function of Q as follows:

$$L(Q)=a+b*Q+c*Q^2$$

where coefficients a, b, and c are measured for a given inverter.

For a given DG system comprising N inverters, an optimum number of inverters p over which the total reactive power Q can be produced while minimizing the losses incurred can be found as follows:

$$L(p)=p*(a+b*(Q/p)+c*(Q/p)^2)$$

The optimum number of inverters p can then be found by setting the derivative of L(p) to zero and solving for p:

$$dL/dp=a-c*Q/p^2=0$$

Thus, $$p=Q*(a/c)^{0.5} \text{ rounded to the closest integer}$$

Coefficients a, b, and c may differ depending upon whether the inverters are producing real power or not, and will depend upon the type of inverter used. However, such determination of p remains valid if each group is treated independently. Additionally, the optimum number of inverters p must be determined to insure that the current rating of the inverters is not exceeded, thereby bringing additional boundaries to the number of inverters employed.

The method 600 proceeds to step 610, where the NOC provides the required VAr compensation information to the gateway. In alternative embodiments, the gateway may directly determine the required VAr compensation. At step 612, the gateway drives the inverters to generate the required VAr compensation. The required VAr compensation may comprise generating reactive power or absorbing reactive power (i.e., generating negative reactive power). In some embodiments, the gateway provides a peak reactive current request to each of the inverters identified per the optimum solution in order to generate the required VAr compensation. In addition to generating the required VAr compensation, the inverters may simultaneously generate real power.

The method proceeds to step 614, where a determination is made whether to continue providing VAr compensation. If the condition at step 614 is met, the method 600 returns to step 604. If the condition at step 614 is not met, the method 600 proceeds to step 616 where it ends.

Figure 7:
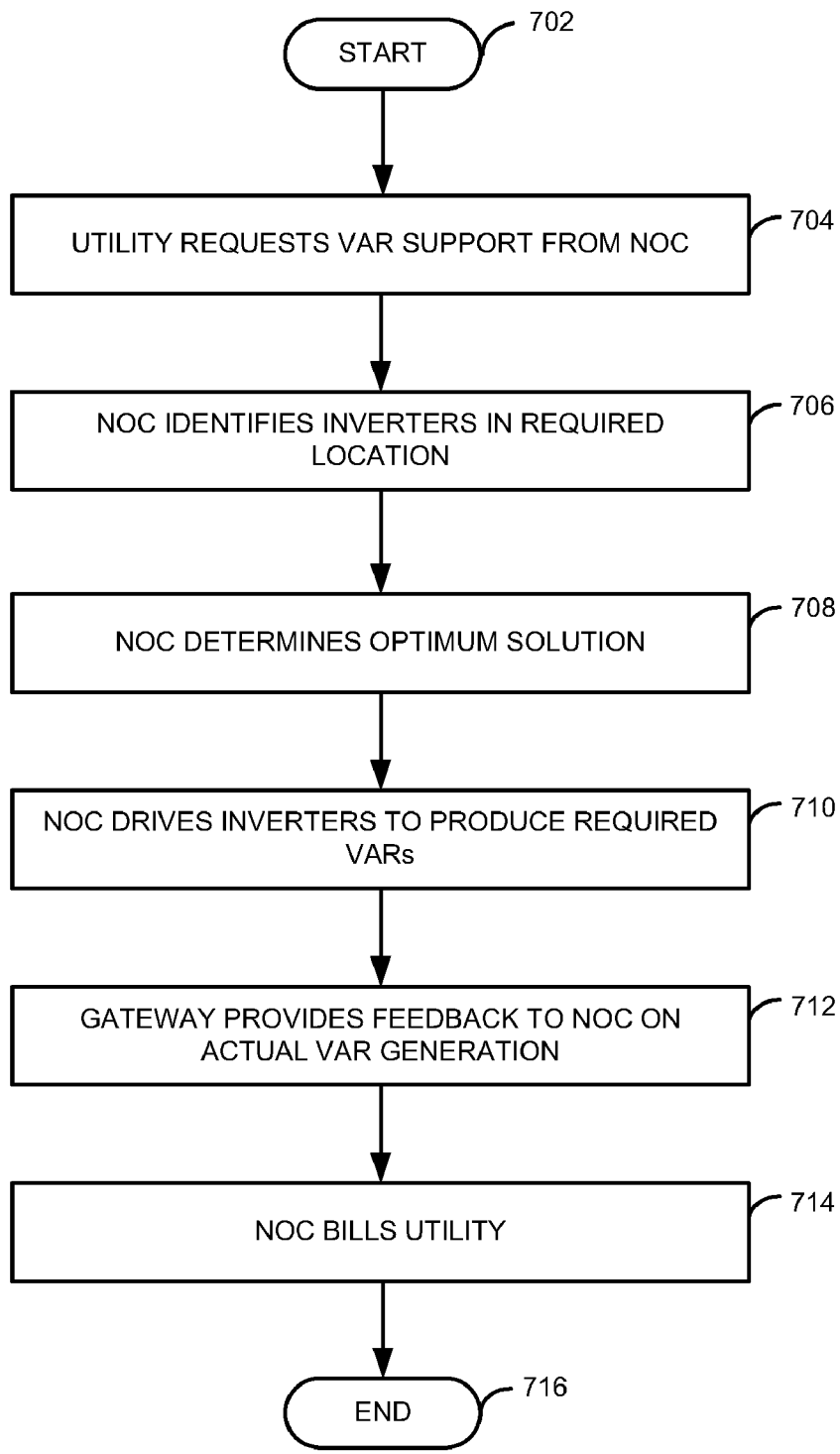
FIG. 7 is a flow diagram of a method for generating distributed on-demand VAr compensation for a utility company in accordance with one or more embodiments of the present invention.

FIG. 7 is a flow diagram of a method 700 for generating distributed on-demand VAr compensation for a utility company in accordance with one or more embodiments of the present invention. The method 700 begins at step 702 and proceeds to step 704, where a utility company requests VAr support from a VAr management entity NOC. The utility company identifies the amount of VAr compensation required along with an area where the compensation is to be applied. At step 706, the NOC identifies any DG inverters in the identified area that are capable of producing reactive power. In some embodiments, the NOC may report the identified inverters to the utility company.

The method 700 proceeds to step 708, where the NOC determines an optimum solution for the identified inverters to generate the required VAr compensation, where the optimum solution determines a number of inverters to provide the required VAr compensation while minimizing real power dissipation during the reactive power generation and insuring that the current rating of the inverters is not exceeded, as previously described in the method 600.

The method 700 proceeds to step 710, where the NOC drives the inverters identified per the optimum solution via their respective gateways to generate the required VAr compensation. In some embodiments, the gateways provide a peak reactive current request to each inverter to generate required VAr compensation. The required VAr compensation may comprise generating reactive power or absorbing reactive power (i.e., generating negative reactive power); in addition to generating the required VAr compensation, the inverters may simultaneously generate real power. Alternatively, the NOC may directly drive the inverters to generate the required VAr compensation. In other embodiments, one or more gateways may determine the optimum VAr compensation solution based on data provided by the NOC and drive the inverters in accordance with the solution.

At step 712, the associated gateway(s) provide feedback to the NOC regarding the reactive power generated by the inverters. The NOC in turn provides such feedback to the utility company. At step 714, the NOC bills the utility company for the VAr compensation service provided. The method 700 then proceeds to step 716, where it ends.

While the foregoing is directed to embodiments of the present invention, other and further embodiments of the invention may be devised without departing from the basic scope thereof.

The invention claimed is:

1. A method for generating on-demand Volt-Ampere reactive (VAr) compensation, comprising:
   determining an amount of VAr compensation required;
   requesting at least one distributed generator (DG) to generate reactive power commensurate with the amount; and
   driving at least one DC/AC inverter of the at least one DG to generate the reactive power, wherein the at least one DC/AC inverter is an optimum number of DC/AC inverters for minimizing a real power loss generated when producing the reactive power.

2. The method of claim 1, further comprising:
   identifying the at least one DG, wherein the at least one DG is capable of generating reactive power.

3. The method of claim 1, wherein the determining an amount of VAr compensation required comprises:
   obtaining power consumption data; and
   utilizing the power consumption data to obtain the amount.

4. The method of claim 1, further comprising providing feedback on reactive power generated.

5. The method of claim 1, wherein the driving comprises:
providing a peak reactive current request to one or more of the at least one DC/AC inverters;
generating a control signal based on the peak reactive current request; and
applying the control signal to the one or more of the at least one DC/AC inverters.

6. The method of claim 5, wherein the generating a control signal comprises modulating the peak reactive current request with a cosine waveform having a frequency of a commercial power grid waveform and a phase lagging the commercial power grid waveform by 90°.

7. The method of claim 1, wherein the reactive power is a negative reactive power.

8. A DC/AC inverter for generating on-demand power, comprising:
a DC/AC inverter controller for driving the DC/AC inverter to generate reactive power commensurate with a peak reactive current request; and
a first multiplier for modulating the peak reactive current request with a cosine waveform having a frequency of a commercial power grid waveform and a phase lagging the commercial power grid waveform by 90° to generate a control signal, wherein the DC/AC inverter controller generates the control signal based on the peak reactive current request for driving the DC/AC inverter.

9. The DC/AC inverter of claim 8, wherein the DC/AC inverter controller generates the control signal based on a peak real current request in addition to the peak reactive current request.

10. The DC/AC inverter of claim 9, wherein the DC/AC inverter generates real power commensurate with the peak real current request simultaneously with the reactive power.

11. The DC/AC inverter of claim 9, further comprising a second multiplier for modulating the peak real current request with a sine waveform having a frequency and a phase of the commercial power grid waveform to generate the control signal.

12. The DC/AC inverter of claim 8, wherein the reactive power is a negative reactive power.

13. A system for generating on-demand Volt-Ampere reactive (VAr) compensation, comprising:
at least one distributed generator (DG) for generating AC power, wherein the at least one DG is coupled to a commercial power grid and comprises at least one DC/AC inverter; and
a gateway, communicably coupled to the at least one DG, for driving one or more of the at least one DC/AC inverters to generate reactive power commensurate with an amount of VAr compensation required, wherein the one or more of the at least one DC/AC inverters is an optimum number of DC/AC inverters for minimizing a real power loss generated when producing the reactive power.

14. The system of claim 13, wherein the gateway determines the amount based on power consumption data.

15. The system of claim 13, wherein the reactive power is a negative reactive power.

16. The system of claim 13, further comprising a VAr management entity NOC, communicably coupled to the gateway and the at least one DG, for determining the amount.

* * * * *